MATTESON & WILLIAMSON.
Plow.
No. 3,179. Reissued Nov. 3, 1868.
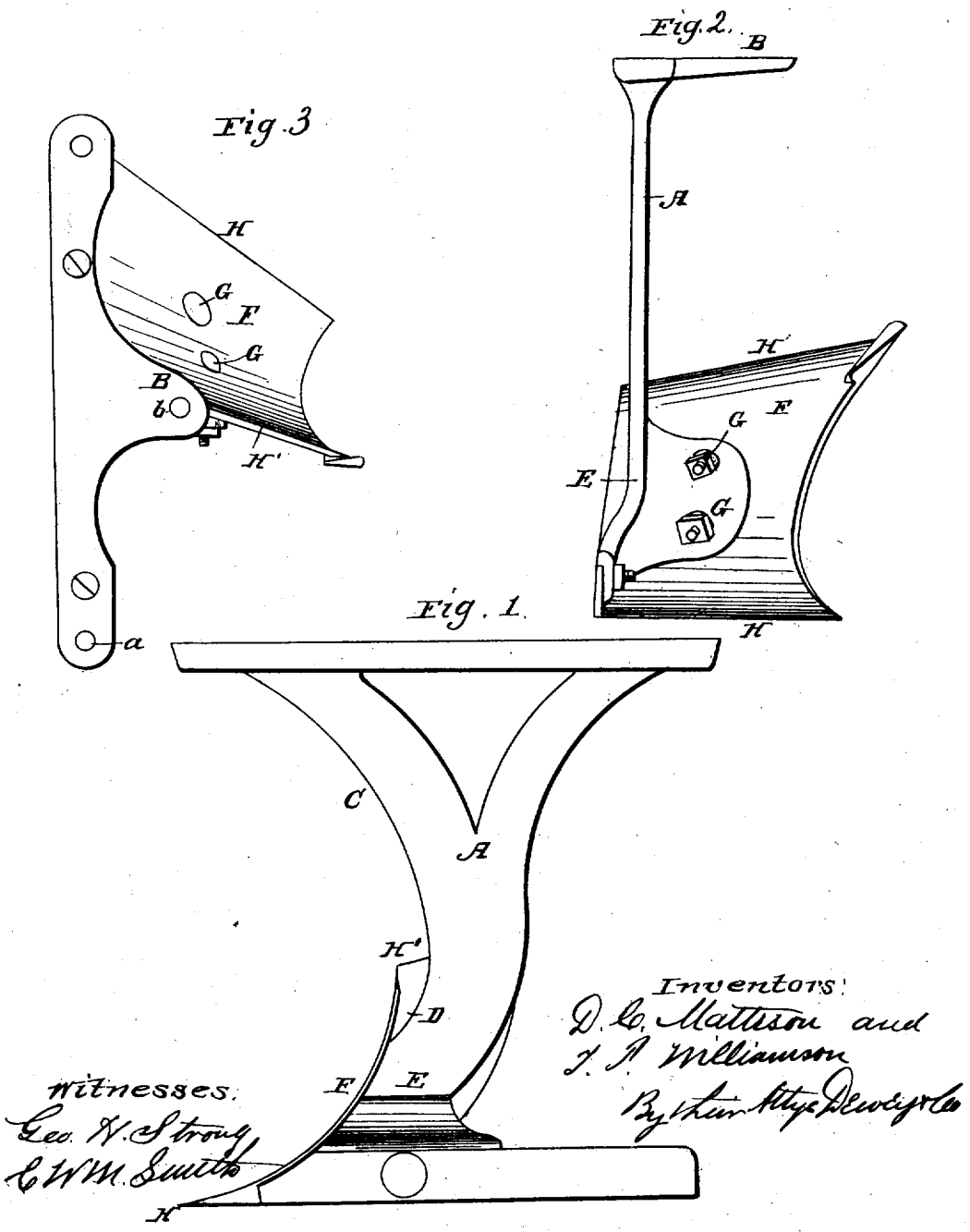
N. PETERS, Photo-Lithographer, Washington, D. C.

UNITED STATES PATENT OFFICE.

DON CARLOS MATTESON AND TRUMAN P. WILLIAMSON, OF STOCKTON, CAL.

IMPROVEMENT IN PLOWS.

Specification forming part of Letters Patent No. 62,766, dated March 12, 1867; Reissue No. 3,179, dated November 3, 1868.

*To all whom it may concern:*

Be it known that we, DON CARLOS MATTESON and TRUMAN PANE WILLIAMSON, of the city of Stockton, San Joaquin county, State of California, have invented certain new and useful Improvements in Plows; and we do hereby declare the following description and accompanying drawings are sufficient to enable any person skilled in the art or science to which it most nearly appertains to make and use our said invention or improvements, without further invention or experiment.

The nature of our invention is to provide an improved plow, which is made with a mold-board having a double edge, and is so constructed that by simply removing the two retaining-bolts it can be reversed, and a new and sharp edge brought into use. The standard which holds it to the beam has also a peculiar construction, which, together with certain offsets, prevents its becoming clogged with weeds, while, by means of a projecting lug on its top, the attachment to the beam is rendered much firmer.

To more fully explain our invention, reference is had to the accompanying drawings, forming a part of this specification, of which—

Figure 1 is a side elevation; Fig. 2, a rear view; Fig. 3, a top view.

Similar letters of reference indicate corresponding parts.

A is the supporting-standard, which is attached to the beam by bolts passing through the bolt-holes *a a* at each end, and also through the hole *b* in the lug B. This construction makes the fastening very firm, and much smaller bolts may be used than where only the holes *a a* are used. The front edge of the standard at C is curved, as shown, so that the forward part is bolted to the beam nearly over the point of the share. This form keeps the weeds and grass from clogging against the beam.

An offset is made at the point D of the standard, a little below the upper edge of the mold-board, and another at the point E, so that the mold-board projects a little beyond the standard. These serve to keep the plow from clogging on the land side.

The mold-board F is made with two complete edges, H and H′, and is bolted to the standard by the two bolts G G in the center. The curve of the face of the mold-board is regular, and the shape is such that it fits equally well with either edge down. The object of this construction is to allow the mold-board to be reversed, so that when one edge becomes dull the two bolts can be removed and the other edge used.

By constructing the plow in this way greater strength is obtained, the mold-board will always have a sharp edge, and can be easily replaced when necessary, while as an article of manufacture it can be afforded much cheaper than those of the ordinary construction.

Having described our invention, we claim as new, and desire to secure by Letters Patent—

The curved standard A, with the lug B and the offsets D and E, substantially as and for the purpose described.

The above specification of our invention signed by us the 11th day of February, 1868, respectively.

DON CARLOS MATTESON.
TRUMAN PANE WILLIAMSON.

Witnesses for Matteson:
WM. F. MCNAMARA,
T. B. MOSHER.

Witnesses for Williamson:
R. W. BRUSH,
CARLOS W. MATTESON.